(12) United States Patent
Muneyasu et al.

(10) Patent No.: US 8,653,372 B2
(45) Date of Patent: Feb. 18, 2014

(54) WIRE HARNESS

(75) Inventors: Kazuhide Muneyasu, Yokkaichi (JP); Minoru Yasuda, Yokkaichi (JP); Tomonari Itou, Yokkaichi (JP); Mitsugu Furutani, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 298 days.

(21) Appl. No.: 13/056,333

(22) PCT Filed: Jun. 8, 2009

(86) PCT No.: PCT/JP2009/060472
§ 371 (c)(1),
(2), (4) Date: Jan. 28, 2011

(87) PCT Pub. No.: WO2010/016328
PCT Pub. Date: Feb. 11, 2010

(65) Prior Publication Data
US 2011/0120747 A1    May 26, 2011

(30) Foreign Application Priority Data

Aug. 7, 2008  (JP) .................................. 2008-203847
Aug. 22, 2008 (JP) .................................. 2008-214704

(51) Int. Cl.
*H01B 7/00* (2006.01)
(52) U.S. Cl.
USPC ................. 174/110 R; 174/113 R; 174/117 R
(58) Field of Classification Search
USPC .......... 174/36, 120 R, 110 R, 110 SR, 110 N, 174/110 FC
See application file for complete search history.

(56) References Cited

U.S. PATENT DOCUMENTS

| | | | | |
|---|---|---|---|---|
| 4,919,769 A | * | 4/1990 | Lin | ................................ 205/138 |
| 5,149,917 A | * | 9/1992 | Sawada et al. | ............ 174/129 R |
| 5,216,205 A | * | 6/1993 | Fujii et al. | .................. 174/128.1 |
| 6,120,327 A | | 9/2000 | O'Brien et al. | |
| 7,084,347 B2 | * | 8/2006 | Mhetar et al. | .............. 174/110 R |
| 7,230,186 B2 | | 6/2007 | Izumida et al. | |
| 7,528,319 B2 | * | 5/2009 | Kondo et al. | ..................... 174/36 |
| 2007/0017691 A1 | * | 1/2007 | Izumida et al. | ............ 174/110 R |
| 2009/0166057 A1 | * | 7/2009 | Kondo et al. | ............... 174/128.1 |
| 2010/0233912 A1 | * | 9/2010 | Chiang | .......................... 439/638 |
| 2010/0263911 A1 | * | 10/2010 | Watanabe | .................. 174/126.2 |

FOREIGN PATENT DOCUMENTS

| | | |
|---|---|---|
| DE | 29808976 U1 | 11/1999 |
| EP | 0305058 A2 | 3/1989 |
| JP | 2000-203354 | 7/2000 |
| JP | 2004-63290 | 2/2004 |
| JP | 2004-87436 | 3/2004 |
| JP | 2004-288625 | 10/2004 |

(Continued)

*Primary Examiner* — William H Mayo, III
(74) *Attorney, Agent, or Firm* — Gerald E. Hespos; Michael J. Porco; Matthew T. Hespos

(57) ABSTRACT

A wire harness is constructed by bundling a plurality of electric wires in which conductors are surrounded with insulating coatings respectively. The electric wires are constructed of aluminum electric wires in which the conductors consist of aluminum or aluminum alloy and copper electric wires in which the conductors consist of copper or copper alloy. A plurality of the aluminum electric wires is disposed so as to surround the copper electric wires having a lower shape retention property than the aluminum electric wires. The bundles electric wires include bent portions formed by bending or curving the bundled electric wires respectively.

14 Claims, 13 Drawing Sheets

(56) References Cited

FOREIGN PATENT DOCUMENTS

| | | |
|---|---|---|
| JP | 2005-93301 | 4/2005 |
| JP | 2006-12468 | 1/2006 |
| JP | 2006-339040 | 12/2006 |
| JP | 2009-170178 | 7/2009 |

* cited by examiner

WIRE HARNESS

BACKGROUND OF THE INVENTION

1. Field of the Invention

The present invention relates to a wire harness.

2. Description of the Related Art

In Japanese Patent Application Laid-Open No. 2000-203354, there is disclosed an art of wiring a wire harness composed by bundling a plurality of electric wires on a door of a car. Because the conductors of the electric wires are made of copper comparatively deformable, the situation that the electric wires are deformable is not improved even though the electric wires are bundled. Therefore in wiring the wire harness on the door, the wire harness is wired along a predetermined wiring path by placing the wire harness at a plurality of positions of the wiring path with a fixing tool such as a clip.

At a site where the wire harness is wired along the predetermined wiring path, as described above, it is necessary to perform the work of locking the wire harness to a plurality of fixtures fixed to the door in advance or the work of mounting a plurality of fixtures mounted on the wire harness in advance on the door. Thus much work effort is required. Therefore improvement in workability is desired.

The present invention has been completed based on the above-described situation. It is an object of the present invention to improve work efficiency.

SUMMARY OF THE INVENTION

The present invention provides a wire harness constructed by bundling a plurality of electric wires, wherein at least one electric wire of a plurality of the electric wires is an aluminum electric wire using aluminum or an aluminum alloy as a conductor thereof.

Aluminum has a higher bending rigidity than copper. Therefore owing to the use of the aluminum, the wire harness of the present invention has a higher shape retention property than a wire harness composed of bundled electric wires using copper as the conductor thereof. Thereby the wire harness can be shaped into or held in a configuration along a predetermined wiring path. By so doing, in wiring the wire harness on various members, it is possible to decrease the number of positions where the wire harness is mounted midway in the wiring path. Therefore the number of steps of the wire harness-positioning work is decreased.

As the form of the present invention, it is preferable to adopt forms described below.

It is preferable that a plurality of aluminum electric wires is disposed with the aluminum electric wires surrounding other electric wires having a lower shape retention property than the aluminum electric wires. Thereby it is possible to securely hold all electric wires constructing the wire harness in a predetermined wiring configuration.

It is preferable that a plurality of electric wires including aluminum electric wires is bent into a predetermined wiring configuration respectively by means of a jig or a press. By using the jig or the press, it is possible to bend the wire harness into the predetermined wiring configuration with a high reliability and accuracy.

It is preferable that by winding an adhesive tape round a region extending over flexed or curved bent portions of a bundle of a plurality of electric wires and straight portions disposed in the vicinities of the bent portions, a plurality of the electric wires is held in a bundled state and in a predetermined bent configuration. Further it is preferable that by fitting a region extending over flexed or curved bent portions of a bundle of a plurality of electric wires and straight portions disposed in the vicinities of the bent portions in a holder, a plurality of the electric wires is held in a bundled state and in a predetermined bent configuration. Thereby a plurality of the electric wires can be held in the predetermined bent configuration with a plurality of the electric wires bundled, and workability in wiring the wire harness is improved.

It is preferable that a plurality of electric wires include a rectangular electric wire using a conductor rectangular in a cross-sectional configuration thereof. Let it be supposed that the cross-sectional area of the conductor of the rectangular electric wire is equal to that of the conductor of the round electric wire. Comparing a conventional round electric wire using a conductor circular in its section and the rectangular electric wire of the present invention with each other, the rectangular electric wire has a higher rigidity. Therefore the wire harness of the present invention is superior to the wire harness composed of the bundled round electric wires in its shape retention property owing to the conductor of the rectangular electric wire. Thereby the wire harness of the present invention can be shaped into a configuration along the predetermined wiring path.

In wiring the wire harness, owing to the use of the rectangular electric wire, it is possible to decrease the number of positions where the wire harness is mounted midway in the wiring path. Therefore the number of steps of the wire harness-positioning work is decreased. When the cross-sectional area of the conductor of the rectangular electric wire is equal to that of the conductor of the round electric wire, the surface area of the conductor of the rectangular electric wire is larger than that of the conductor of the round electric wire. Thus the conductor of the rectangular electric wire is superior to the conductor of the round electric wire in the heat dissipation thereof at an energization time. When it is considered that as the temperature of the conductor rises, the electric resistance becomes increasingly high, the wire harness of the present invention is excellent in the energization efficiency thereof.

It is preferable that a rectangular electric wire is an aluminum electric wire. Thereby owing to the shape retention property of the rectangular electric wire and that of the aluminum electric wire, it is possible to improve work efficiency to a higher extent.

It is preferable that at least one portion of the wire harness in a longitudinal direction thereof is formed as a bent portion, and in the bent portion, the conductor of the rectangular electric wire is so bent that one of a pair of narrow outer surfaces, of four outer surfaces of the conductor, which form short sides thereof in a cross section is compressed and the other of the narrow outer surfaces is elongated to shape the bent portion into a predetermined configuration. Thereby it is possible to enhance the shape retention property of the rectangular electric wire and stably hold the bent configuration of the bent portion.

It is preferable that the wire harness is constructed of a plurality of rectangular electric wires and round electric wires using conductors circular in a cross-sectional configuration thereof, wherein a plurality of the rectangular electric wires is disposed with the rectangular electric wires surrounding the round electric wires. Thereby it is possible to reliably hold all the electric wires constructing the wire harness in the predetermined configuration.

It is preferable that a plurality of electric wires including rectangular electric wires is bent into a predetermined wiring configuration by means of a jig or a press. By using the jig or the press, owing to the use of the rectangular electric wire, it is possible to bend the wire harness into the predetermined wiring configuration with a high reliability and accuracy.

According to the present invention, it is possible to improve work efficiency in wiring the wire harness.

DETAILED DESCRIPTION OF THE PREFERRED EMBODIMENTS

Embodiment 1

Figure 1:
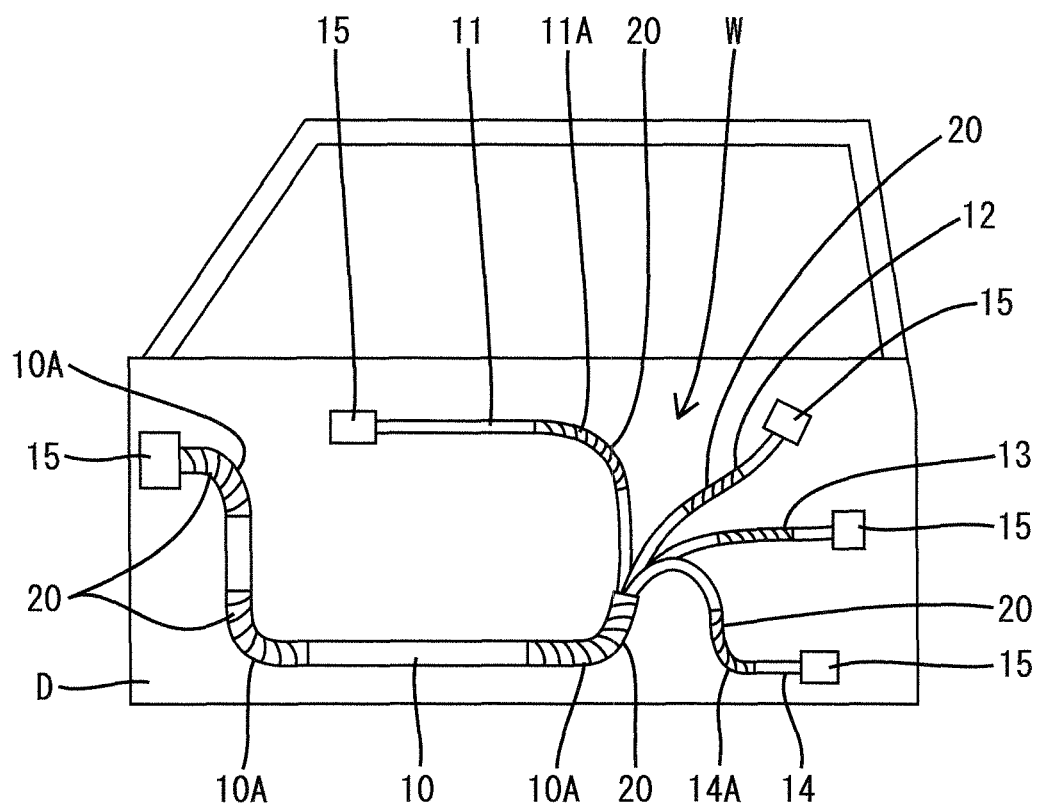
FIG. 1 is a side view showing a state in which a wire harness an embodiment 1 of the present invention is wired on a door.

The embodiment 1 of the present invention is described below with reference to FIGS. 1 through 6. In FIGS. 2 through 6 showing sections of a wire harness W, hatching is omitted for convenience.

The wire harness W of the embodiment 1 is constructed by bundling a plurality of electric wires 16, 17 and has a form a first branch harness part 11, a second branch harness part 12, a third branch harness part 13, and a fourth branch harness part 14 branch from a distal end of one main harness part 10. A proximal end of the main harness part 10 and a distal end of each of the branch harness parts 11, 12, 13, and 14 are provided with a connector 15 accommodating terminal fittings (not shown) connected to the electric wires 16, 17.

The wire harness W is constructed of four copper electric wires 16 and 10 aluminum electric wires 17. The copper electric wire 16 is conventionally and generally used and has a known form in which a conductor 16A, sectionally circular, which consists of copper or a copper alloy is surrounded with an insulating coating 16B cylindrical and concentric with the conductor 16A. The conductor 16A of the copper electric wire 16 consists of a stranded wire composed of a plurality of thin metal wires. The aluminum electric wire 17 has a form in which a conductor 17A, sectionally circular, which consists of aluminum or an aluminum alloy is surrounded with an insulating coating 17B cylindrical and concentric with the conductor 17A. The conductor 17A of the aluminum electric wire 17 consists of a stranded wire composed of a plurality of thin metal wires. Because the conductivity of aluminum is lower than that of copper, the outer diameter of the conductor 17A of the aluminum electric wire 17 is set larger than that of the conductor 16A of the copper electric wire 16 to decrease the electric resistance thereof so that a predetermined current value can be securely obtained. To use a terminal fitting commonly to the copper electric wire 16 and the aluminum electric wire 17, the outer diameter of the aluminum electric wire 17 is set almost equally to that of the copper electric wire 16. Therefore the insulating coating 17B of the aluminum electric wire 17 is thinner than the insulating coating 16B of the copper electric wire 16.

Figure 2:
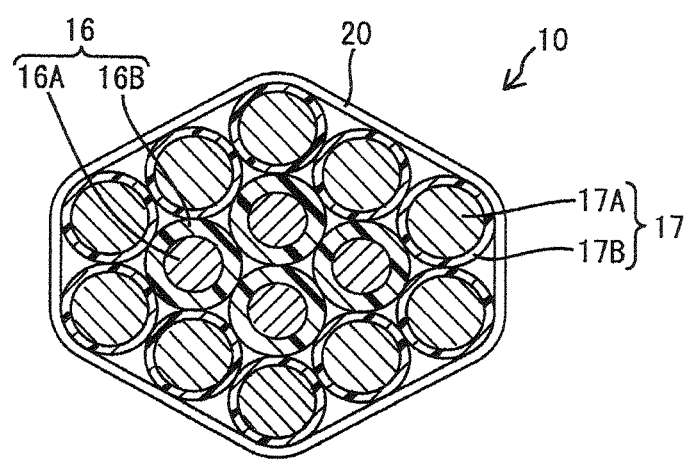
FIG. 2 is a sectional view of a main harness part.

As shown in FIG. 2, in the main harness part 10, the four copper electric wires 16 and the 10 aluminum electric wires 17 are bundled. The four copper electric wires 16 are collectively disposed at a central portion of the main harness part 10, whereas the 10 aluminum electric wires 17 are disposed over almost the entire circumference of the four copper electric wires 16 with the 10 aluminum electric wires 17 surrounding the four copper electric wires 16. In other words, the aluminum electric wires 17 are disposed on the periphery of the main harness part 10. A plurality of bent portions 10A having a form in which predetermined positions are bent at a small radius of curvature or curved at a comparatively large radius of curvature is formed at the main harness part 10 by deforming the bundled 14 electric wires 16, 17 held almost straight with an unshown jig or a press (die). Thereby at the main harness part 10, a plurality of the bent portions 10A and a plurality of straight portions are disposed alternately in the longitudinal direction of the main harness part 10.

Because the main harness part 10 includes the aluminum electric wires 17 having the conductors 17A made of aluminum higher than copper in its shape retention property, owing to its shape retention property, the main harness part 10 is held by shaping it into a predetermined configuration along a predetermined wiring path consisting of predetermined bent configurations and a linear configuration. An adhesive tape 20 is wound round the main harness part 10 from the bent portions 10A thereof to the straight portions disposed in the neighborhood of the bent portions 10A. The adhesive tape 20 displays the function of holding the state in which the copper electric wires 16 and the aluminum electric wires 17 are bundled and the function of holding the bent configurations of the bent portions 10A.

Figure 3:
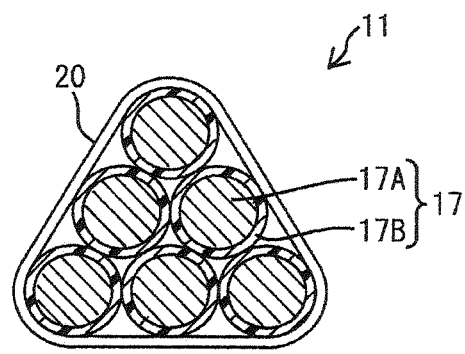
FIG. 3 is a sectional view of a first branch harness part.

As shown in FIG. 3, the first branch harness part 11 consists of bundled six aluminum electric wires 17 of the 10 aluminum electric wires 17 constructing the main harness part 10. The conductors 17A of the six aluminum electric wires 17 hold the first branch harness part 11 in a predetermined wiring configuration. The adhesive tape 20 is also wound round the first branch harness part 11 from the bent portions 11A thereof to the straight portions disposed in the neighborhood of the bent portions 11A. Thereby the first branch harness part 11 is held in a predetermined wiring configuration and in a state in which the six aluminum electric wires 17 are bundled.

Figure 4:
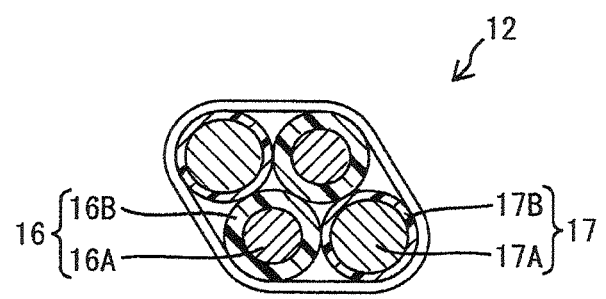
FIG. 4 is a sectional view of a second branch harness part.

As shown in FIG. 4, the second branch harness part 12 consists of bundled two aluminum electric wires 17 of the 10 aluminum electric wires 17 constructing the main harness part 10 and two copper electric wires 16 of the four copper electric wires 16. The conductors 17A of the two aluminum electric wires 17 hold the second branch harness part 12 in a predetermined wiring configuration. The adhesive tape 20 is also wound round the second branch harness part 12. Thereby the second branch harness part 12 is held in a predetermined wiring configuration and in a state in which the two aluminum electric wires 17 and the two copper electric wires 16 are bundled.

Figure 5:
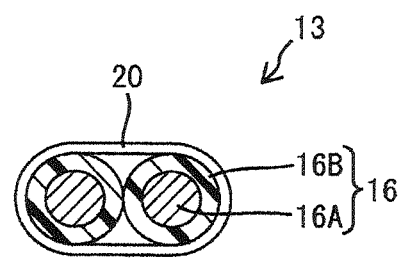
FIG. 5 is a sectional view of a third branch harness part.

As shown in FIG. 5, the third branch harness part 13 consists of bundled two copper electric wires 16 of the four copper electric wires 16 constructing the main harness part 10. The two copper electric wires 16 are different from those of the second branch harness part 12. Thus in the third branch harness part 13, the shape retention property to be provided by the conductor 17A of the rectangular electric wire 17 cannot be obtained. Therefore the adhesive tape 20 holds the third branch harness part 13 in a predetermined wiring configuration.

Figure 6:
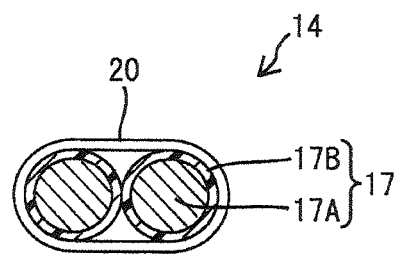
FIG. 6 is a sectional view of a fourth branch harness part.

As shown in FIG. 6, the fourth branch harness part 14 consists of bundled two aluminum electric wires 17 of the 10 aluminum electric wires 17 constructing the main harness part 10. The two aluminum electric wires 17 are different from those branched to the first branch harness part 11 and the second branch harness part 12. The conductors 17A of the two aluminum electric wires 17 hold the fourth branch harness part 14 in a predetermined wiring configuration. The adhesive tape 20 is also wound round the fourth branch harness part 14 from a bent portion 14A thereof to the straight portion disposed in the neighborhood of the bent portion 14A. Thereby the fourth branch harness part 14 is held in a predetermined wiring configuration and in a state in which the two aluminum electric wires 17 are bundled.

Because the wire harness W of the embodiment 1 has the aluminum electric wires 17 in which aluminum having a higher bending rigidity than copper is used as the conductor 17A, the wire harness W has a high shape retention property. By utilizing this property, the wire harness W is so molded that the wire harness keeps the configuration along a predetermined wiring path. That is, the wire harness W is shaped into or held in a configuration along the predetermined wiring path. Therefore in mounting the wire harness W on a door D, it is unnecessary to perform a work of making bending deformation along the wiring path. Further it is unnecessary to perform a work for positioning a portion of the wire harness W midway in the wiring path on the door D and use parts for the positioning work. As described above, according to the embodiment 1, because the number of steps of the wire harness-mounting work is decreased, improvement of the workability is achieved. Further because the number of parts is decreased, the cost is reduced.

Embodiment 2

Figure 7:
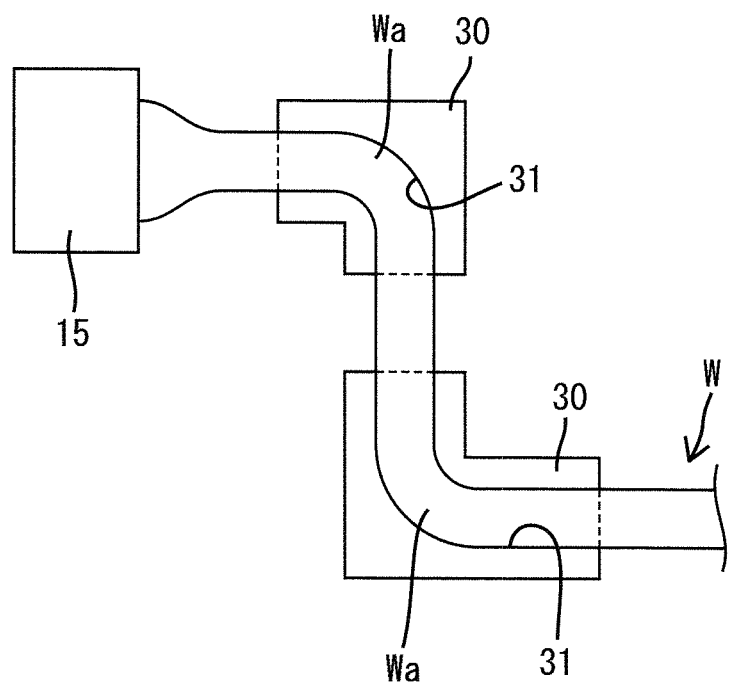
FIG. 7 is a block diagram of a wire harness of an embodiment 2.
Figure 8:
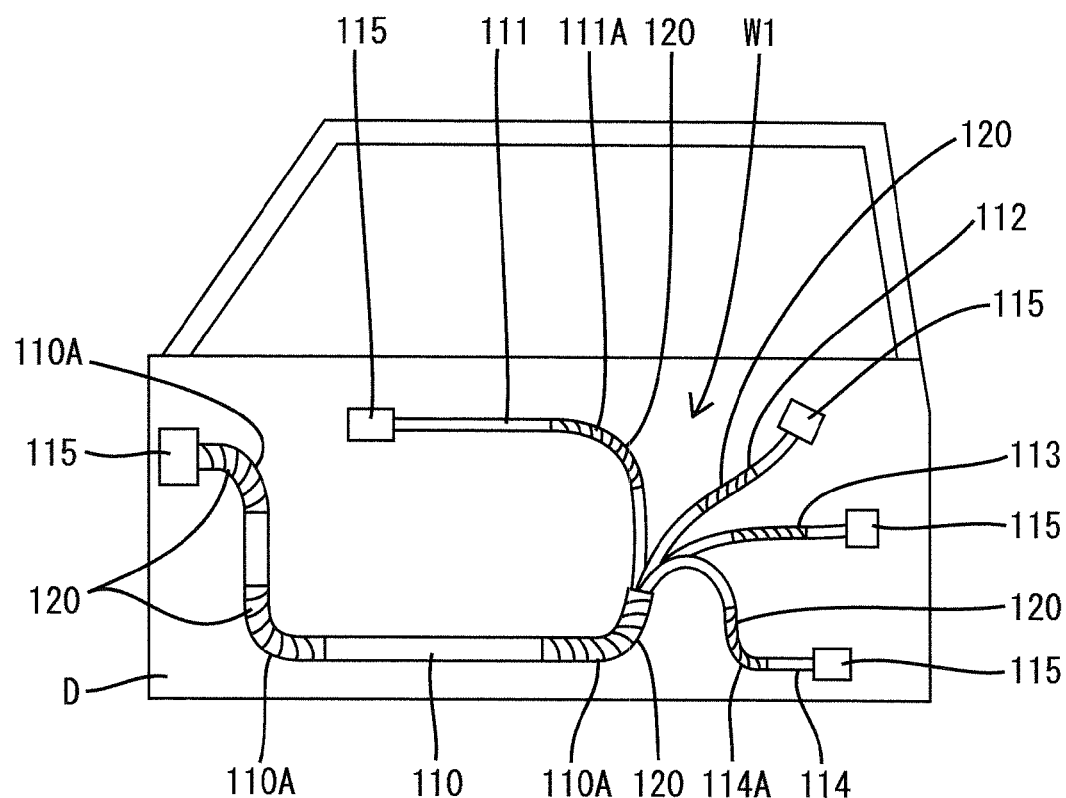
FIG. 8 is a side view showing a state in which a wire harness an embodiment 3 of the present invention is wired on a door.

The embodiment 2 of the present invention is described below with reference to FIG. 7. The embodiment 2 is different from the embodiment 1 in that means for holding the configurations of bent portions Wa of a wire harness W and configurations of straight portions disposed in the vicinities thereof has a construction different from that of the embodiment 1. Because other constructions of the embodiment 2 is the same as that of the embodiment 1, the same parts of the embodiment 2 as those of the embodiment 1 are denoted by the same reference numerals as those of the embodiment 1, and the description of the constructions, operation, and effect thereof is omitted herein.

In the embodiment 2, as a means for holding the configuration of the wire harness W, a holder 30 having a groove 31 whose configuration fits the configuration of a bent portion Wa and those of the straight portions disposed in the neighborhood of the bent portion Wa is used. Utilizing the high bending rigidity of the conductors 17A of the aluminum electric wires 17, the wire harness W is shaped in a predetermined configuration by bending it. The bent wire harness W is fitted in the groove 31 of the holder 30. Because the holder 30 is made of a highly rigid material, the holder 30 securely holds the wire harness W in the predetermined configuration.

In the embodiments 1, 2, embodiments described below can be included in the technical scope of the present invention.

(1) In the embodiments 1, 2, a part of a plurality of the electric wires constructing one wire harness consists of the aluminum electric wires. But according to the present invention, all of a plurality of the electric wires constructing one wire harness may consist of the aluminum electric wires.

(2) In the embodiments 1, 2, the aluminum electric wires are disposed on the peripheral side of one wire harness. But the aluminum electric wires may be disposed in the vicinity of the center position thereof.

(3) In the embodiments 1, 2, as the means for holding the wire harness in the form of the bent configuration along the predetermined wiring path, the method of winding the adhesive tape round the wire harness or the method of fitting the wire harness in the holder is used. But according to the present invention, it is possible to use both the method of winding the adhesive tape round the wire harness and the method of fitting the wire harness in the holder or hold the wire harness in the predetermined bent configuration by the aluminum electric wires without using both methods.

(4) In the embodiments 1, 2, the conductor of the copper electric wire is a stranded wire consisting of a plurality of stranded thin metal wires. But the conductor may be one single-core wire.

(5) In the embodiments 1, 2, the conductor of the aluminum electric wire is a stranded wire consisting of a plurality of stranded thin metal wires. But the conductor may be one single-core wire.

(6) In the embodiments 1, 2, the wire harness is composed by bundling 10 aluminum electric wires and four copper electric wires. But the number of the aluminum electric wires and that of the copper electric wires are not limited to the above-described number, but it is possible to adopt various combinations.

(7) In the embodiments 1, 2, the case in which the wire harness is wired on a door of a car is described. But the present invention is applicable to wire harnesses to be wired on members other than the door.

Embodiment 3

The embodiment 3 of the present invention is described below with reference to FIGS. 8 through 13. In FIGS. 9 through 13 showing sections of a wire harness W1, hatching is omitted for convenience.

The wire harness W1 of the embodiment 3 is constructed by bundling a plurality of electric wires 116, 117 and has a form in which a first branch harness part 111, a second branch harness part 112, a third branch harness part 113, and a fourth branch harness part 114 branch from a distal end of one main harness part 110. A proximal end of the main harness part 110 and a distal end of each of the branch harness parts 111, 112, 113, and 114 are provided with a connector 115 accommodating terminal fittings (not shown) connected to the electric wires 116, 117.

The wire harness W1 is constructed of four round electric wires 116 and 10 rectangular electric wires 117. The round electric wire 116 is conventionally and generally used and has a known form in which a conductor 116A, circular in its cross section perpendicular to its axis, is surrounded with an insulating coating 116B cylindrical and concentric with the conductor 116A. The conductor 116A of the round electric wire 116 is made of copper or a copper alloy and consists of a stranded wire composed of a plurality of thin metal wires. The conductor 116A of the round electric wire 116 may be made of aluminum or an aluminum alloy.

The rectangular electric wire 117 has a form in which a conductor 117A, rectangular in its cross section perpendicular to its axis, is surrounded with an insulating coating 117B rectangular frame-shaped in its cross section. The conductor 117A of the rectangular electric wire 117 is made of aluminum or an aluminum alloy and composed of one metal wire rod which is called a single-core wire. The conductor 117A of the rectangular electric wire 117 may be made of copper or a copper alloy. An outer surface of the conductor 117A is constructed of a pair of narrow outer surfaces 118N forming the short side thereof in a cross section in FIGS. 9 through 13 and a pair of wide outer surfaces 118W forming the long side thereof in the cross section. The thickness of the insulating coating 117B is uniform over the entire circumference thereof. The surface (outer surface) of the rectangular electric wire 117 (insulating coating 117B) is constructed of a pair of narrow surfaces 119N forming the short side thereof in a cross section and a pair of wide surfaces 119W forming the long side thereof in the cross section.

A metal material used for the conductor 117A of the rectangular electric wire 117 and the conductor 116A of the round electric wire 116 have the same properties such as the conductivity thereof. Because the conductivity of the conductor 116A and that of the conductor 117A are equal to each other, the cross-sectional area of the conductor 116A of the round electric wire 116 is almost equal to that of the conductor 117A of the rectangular electric wire 117.

Figure 9:
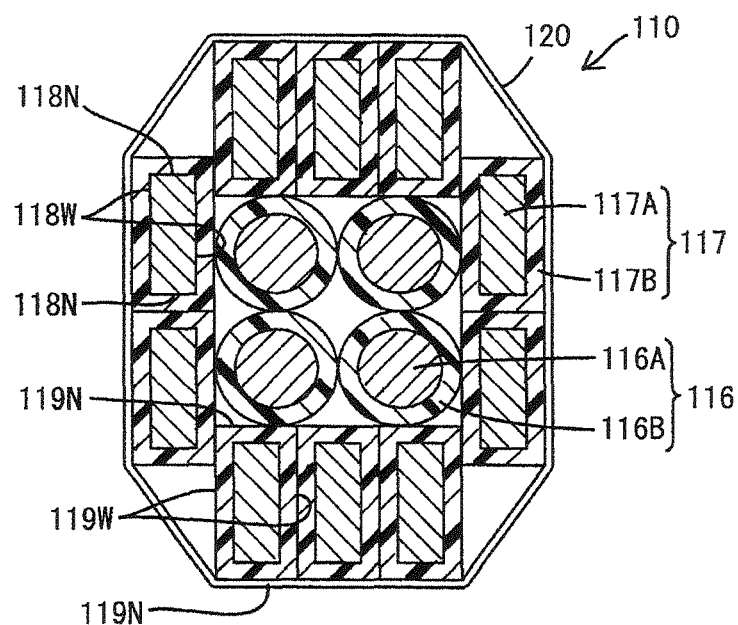
FIG. 9 is a sectional view of a main harness part.

As shown in FIG. 9, in the main harness part 110, four round electric wires 116 and 10 rectangular electric wires 117 are bundled. The four round electric wires 116 are collectively disposed at a central portion of the main harness part 110, whereas the 10 rectangular electric wires 117 are disposed with the 10 rectangular electric wires 117 surrounding the four round electric wires 116 over almost the entire circumference of the four round electric wires 116. In other words, the rectangular electric wires 117 are disposed on the periphery of the main harness part 110. Regarding the orientation of the 10 rectangular electric wires 117, the wide surfaces 119W (orientation of long side in cross section) of all the rectangular electric wires 117 are parallel with one another, and the narrow surfaces 119N (orientation of short side in cross section) thereof are parallel with one another. That is, the wide outer surfaces 118W (orientation of long side in cross section) of all the conductors 117A are parallel with one another, and the narrow outer surfaces 118N (orientation of short side in cross section) are parallel with one another.

A plurality of bent portions 110A having a form in which predetermined positions are bent at a small radius of curvature or curved at a comparatively large radius of curvature is formed at the main harness part 110 by deforming the bundled 14 electric wires 16, 17 held almost straight with an unshown jig or a press (die) which pressurizes the 14 electric wires 16, 17. Thereby at the main harness part 110, a plurality of the bent portions 110A and a plurality of straight portions are disposed alternately in the longitudinal direction thereof.

Describing the orientation (flexed form) of the flexure of bent portions 110A, the rectangular electric wire 117 is so bent that one of a pair of the narrow outer surfaces 118N of the conductor 117A thereof is compressed and that the other of the narrow outer surfaces 118N is elongated. Thereby the bent portions 110A are shaped into a desired bent configuration respectively. Owing to the shape retention property of the conductor 117A of the rectangular electric wire 117, the rectangular electric wire 117 is held in a state in which the rectangular electric wire 117 is shaped into a configuration along a predetermined wiring path consisting of predetermined bent configurations and linear configurations. The adhesive tape 120 is wound round the main harness part 110 from the bent portions 110A thereof to the straight portions disposed in the neighborhood of the bent portions 110A. The adhesive tape 120 displays the function of holding the state in which the round electric wires 116 and the rectangular electric wires 117 are bundled and the function of holding the bent configurations of the bent portions 110A.

As a bending form, a form of bending the rectangular electric wire 117 such that one of a pair of the wide outer surfaces 118W is compressed and that the other of the wide outer surfaces 118W is elongated is conceivable. But a rigidity which becomes a drag (that is, moment of inertia of area about short side in cross section and axis parallel therewith) in returning the bent portion 110A where a pair of the narrow outer surfaces 118N is elongated and contracted to a linear state is larger than a rigidity which becomes a drag (that is, moment of inertia of area about long side in cross section and axis parallel therewith) in returning the bent portion where a pair of the wide outer surfaces 118W is elongated and contracted to a linear state. The rigidity (moment of inertia of area about axis parallel with short side) of the bent portion 110A of the embodiment 3 is larger than the rigidity (moment of inertia of area about axis passing through center of conductor 116A) of the conductor 116A, of the round electric wire 116, having the sectional area equal to that of the conductor 117A. As described above, the bent portion 110A of the embodiment 3 has a high bending rigidity and is excellent in its shape retention property.

Figure 10:
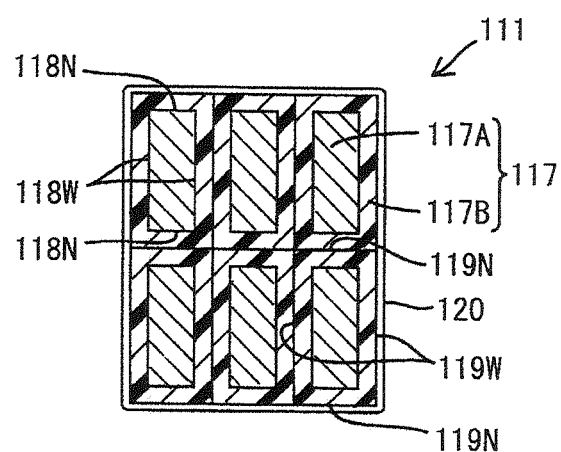
FIG. 10 is a sectional view of a first branch harness part.

As shown in FIG. 10, the first branch harness part 111 consists of bundled six rectangular electric wires 117 of 10 rectangular electric wires 117 constructing the main harness part 110. The conductors 117A of the six rectangular electric wires 117 hold the first branch harness part 111 in a predetermined wiring configuration. In a bent portion 111A of the first branch harness part 111, the rectangular electric wires 117 are shaped into a predetermined configuration by bending them in the same orientation as that of the bent portions 110A of the main harness part 110. The adhesive tape 120 is wound round the first branch harness part 111 from the bent portion 111A thereof to straight portions disposed in the neighborhood of the bent portion 111A. Thereby the first branch harness part 111 is held in a predetermined wiring configuration and in a state in which the six rectangular electric wires 117 are bundled.

Figure 11:
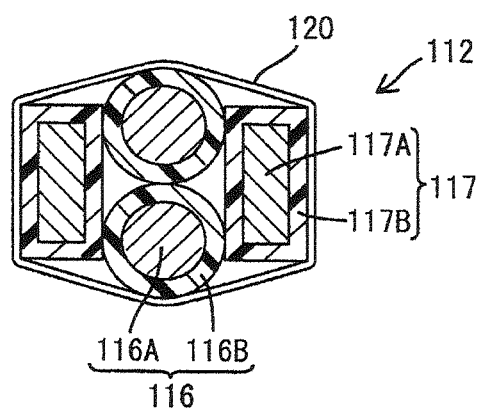
FIG. 11 is a sectional view of a second branch harness part.

As shown in FIG. 11, the second branch harness part 112 consists of bundled two rectangular electric wires 117 of the 10 rectangular electric wires 117 constructing the main harness part 110 and two round electric wires 116 of the four round electric wires 116. The conductors 117A of the two rectangular electric wires 117 hold the second branch harness part 112 in a predetermined wiring configuration. The adhesive tape 120 is also wound round a portion of the second branch harness part 112. Thereby the second branch harness part 112 is held in a predetermined wiring configuration and in a state in which the two rectangular electric wires 117 and the two round electric wires are bundled.

Figure 12:
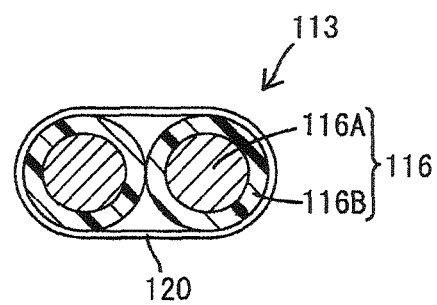
FIG. 12 is a sectional view of a third branch harness part.

As shown in FIG. 12, the third branch harness part 113 consists of bundled two round electric wires 116 of the four round electric wires 116 constructing the main harness part 110. The two round electric wires 116 of the four round electric wires 116 are different from those of the second branch harness part 112. Thus in the third branch harness part 113, the shape retention property to be provided by the conductor 117A of the rectangular electric wire 117 cannot be obtained. Therefore the adhesive tape 120 holds the third branch harness part 113 in a predetermined wiring configuration.

Figure 13:
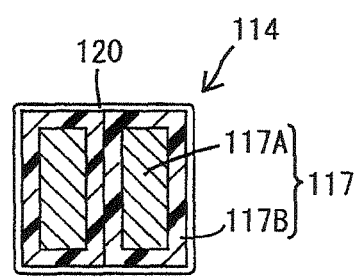
FIG. 13 is a sectional view of a fourth branch harness part.

As shown in FIG. 13, the fourth branch harness part 114 consists of bundled two rectangular electric wires 117 of the 10 rectangular electric wires 117 constructing the main harness part 110. The rectangular electric wires 117 not branched to the first branch harness part 111 and the second branch harness part 112 are used to form the fourth branch harness part 114. The conductors 117A of the two rectangular electric wires 117 hold the fourth branch harness part 114 in a predetermined wiring configuration. In the bent portion 114A of the fourth branch harness part 114, the rectangular electric wires 117 are shaped into a predetermined configuration by bending them in the same orientation as that of the bent portions 110A of the main harness part 110. The adhesive tape 120 is wound round the fourth branch harness part 114 from the bent portion 114A thereof to the straight portion disposed in the neighborhood of the bent portion 114A. Thereby the fourth branch harness part 114 is held in a predetermined wiring configuration and in a state in which the two rectangular electric wires 117 are bundled.

Comparing the round electric wire 116 whose conductor 116A is circular in section and the rectangular electric wire 117 whose conductor 117A is rectangular in section with each other, the rectangular electric wire 117 has a higher rigidity. Therefore the wire harness W1 of the embodiment 3 is superior to the wire harness composed of the bundled round electric wires 116 in the shape retention property owing to the conductor 117A of the rectangular electric wire 117. By utilizing this property, the wire harness W1 is so formed as to keep the configuration along the predetermined wiring path. That is, the wire harness W1 is shaped into the configuration along the predetermined wiring path. Therefore in mounting the wire harness W1 on a door D, it is unnecessary to perform a work of making bending deformation along the wiring path. Further it is unnecessary to perform a work for positioning midway portions of the wire harness W1 on the door D and unnecessary to use parts for the positioning work. As described above, according to the embodiment 3, because the number of steps of the wire harness-mounting work is decreased, improvement of workability is achieved. Further because the number of parts is decreased, the cost is reduced.

The main harness part 110 is constructed of the 10 rectangular electric wires 117 and the round electric wires 116 having the conductors 116A circular in the cross-sectional configuration. The 10 rectangular electric wires 117 are so disposed as to surround the round electric wires 116. Because the 10 rectangular electric wires 117 having a comparatively high rigidity are so disposed as to surround the round electric wires 116 having the conductors 116A, circular in the cross-sectional configuration, whose rigidity is lower than that of rectangular conductors, it is possible to securely hold all the electric wires 116, 117 in the predetermined wiring configuration.

Because a plurality of electric wires 116, 117 including the rectangular electric wires 117 is bent into the predetermined wiring configuration by using a jig or a press, it is possible to securely bend the wire harness W1 into the predetermined wiring configuration at a high precision.

By winding the adhesive tape 120 round the region extending over the bent portions 110A, 111A, and 114A of the bundle of a plurality of the electric wires 116, 117 and the straight portions disposed in the vicinities of the bent portions 110A, 111A, and 114A, a plurality of the bundled electric wires 116, 117 is held in the predetermined bent configuration. Thus the wire harness W1 can be wired with a high workability.

When the cross-sectional area of the conductor 117A of the rectangular electric wire 117 is equal to that of the conductor 116A of the round electric wire 116, the surface area of the conductor 117A of the rectangular electric wire 117 is larger than that of the conductor 116A of the round electric wire 116. Thus the conductor 117A of the rectangular electric wire 117 is superior to the conductor 116A of the round electric wire 116 in the heat dissipation thereof at an energization time. When it is considered that as the temperature of the conductors 116, 117 rises, the electric resistance becomes increasingly high, the wire harness of the embodiment 3 is excellent in the energization efficiency thereof.

In the embodiment 3, embodiments described below can be included in the technical scope of the present invention.

(1) In the embodiment 3, apart of a plurality of the electric wires constructing one wire harness consists of the rectangular electric wire. But according to the present invention, all of a plurality of the electric wires constructing one wire harness may consist of the rectangular electric wire.

(2) In the embodiment 3, the rectangular electric wires are disposed on the peripheral side of one wire harness. But the rectangular electric wires may be disposed in the vicinity of the center position thereof.

(3) In the embodiment 3, as the means for holding the wire harness in the form of the bent configuration along the predetermined wiring path, the method of winding the adhesive tape round the wire harness is used. But according to the present invention, it is possible to hold the bent configuration by using methods other than the method of winding the adhesive tape round one wire harness or hold the wire harness in the predetermined bent configuration by only the rigidity of the rectangular electric wire without using both methods.

(4) In the embodiment 3, the conductor of the rectangular electric wire consists of one single-core wire. But the conductor may be a stranded wire consisting of a plurality of stranded thin metal wires.

(5) In the embodiment 3, the conductor of the round electric wire is a stranded wire consisting of a plurality of stranded thin metal wires. But the conductor may consist of one single-core wire.

(6) In the embodiment 3, the conductor of the rectangular electric wire and the conductor of the round electric wire are made of the same metal material. But the metal material of the conductor of the rectangular electric wire and that of the conductor of the round electric wire are different from each other in the properties thereof.

(7) In the embodiment 3, the wire harness is composed by bundling 10 rectangular electric wires and six round electric wires. But the number of the rectangular electric wires and that of the round electric wires are not limited to the above-described number, but it is possible to adopt various combinations.

(8) In the embodiment 3, regarding the orientations of the cross sections of the rectangular electric wires in the portion including the rectangular electric wires of the wire harness, the orientations of the long sides of all the rectangular electric wires are parallel with one another, and the orientations of the short sides of all the rectangular electric wires are parallel with one another. The orientations of the cross sections of the rectangular electric wires in the portion including the rectangular electric wires are not limited to the above-described form, but the orientation of at least one rectangular electric wire may be different from the orientations of other rectangular electric wire.

(9) In the embodiment 3, the case in which the wire harness is wired on a door of a car is described. But the present invention is applicable to wire harnesses to be wired on members other than the door.

The invention claimed is:
1. A wire harness constructed by bundling a plurality of electric wires in which conductors are surrounded with insulating coatings respectively, wherein said electric wires are constructed of aluminum electric wires in which said conductors consist of aluminum or an aluminum alloy and copper electric wires in which said conductors consist of copper or a copper alloy, a plurality of the aluminum electric wires are disposed so as to surround the copper electric wires having a lower shape retention property than the aluminum electric wires, and the bundled electric wires include bent portions formed by bending or curving the bundles electric wires respectively.

2. A wire harness according to claim 1, wherein a plurality of said electric wires including said aluminum electric wires is bent into a predetermined wiring configuration respectively by means of a jig or a press.

3. A wire harness according to claim 1, wherein by winding an adhesive tape round a region extending over said bent portions and straight portions disposed in vicinities of said bent portions, a plurality of said electric wires is held in a bundled state and in a predetermined bent configuration.

4. A wire harness according to claim 1, wherein by fitting a region extending over said bent portions and straight portions disposed in vicinities of said bent portions in a holder, a plurality of said electric wires is held in a bundled state and in a predetermined bent configuration.

5. A wire harness according to claim 1, wherein a plurality of said electric wires include a rectangular electric wire using a conductor rectangular in a cross-sectional configuration thereof.

6. A wire harness according to claim 5, wherein said rectangular electric wire is said aluminum electric wire.

7. A wire harness according to claim 5, wherein at least one portion in a longitudinal direction is formed as a bent portion, and in said bent portion, said conductor of said rectangular electric wire is so bent that one of a pair of narrow outer surfaces, of four outer surfaces of said conductor, which form short sides thereof in a cross section is compressed and the other of said narrow outer surfaces is elongated to shape said bent portion into a predetermined configuration.

8. A wire harness, according to claim 5, which is constructed of a plurality of said rectangular electric wires and round electric wires using conductors circular in a cross-sectional configuration thereof, wherein a plurality of said rectangular electric wires is disposed with said rectangular electric wires surrounding said round electric wires.

9. A wire harness according to claim 5, wherein a plurality of said electric wires including said rectangular electric wires is bent into a predetermined wiring configuration by means of a jig or a press.

10. A wire harness comprising:

a plurality of first wires, each of the first wires having a first conductor that consists of copper or copper alloy and an insulating coating surrounding the conductor, each of the first conductors having a first shape retention property;

a plurality of second wires, each of the second wires having a second conductor that consists of aluminum or aluminum alloy and an insulating coating surrounding the conductor, each of the second conductors having a second shape retention property that is higher than the first shape retention property;

the first and second wires being bundled together with the second wires being outwardly disposed relative to the first wires and surrounding the first wires to form the wire harness; and the wire harness being bent into a specified non-linear shape, wherein the outwardly disposed first wires with the higher shape retention property retain the specified non-linear shape of the wire harness.

11. The wire harness of claim 10, further comprising adhesive tape wrapped around at least portions of the wire harness that are bent to have the specified non-linear shape.

12. The wire harness of claim 10, wherein the each of the second conductors has a rectangular cross-sectional shape.

13. The wire harness of claim 12, wherein the each of the first conductors has a round cross-sectional shape.

14. The wire harness of claim 10, wherein the each of the second conductors has two opposite wide sides and two opposite narrow sides to define the rectangular cross-sectional shape, the second wires being oriented in the wire harness so that a first of the narrow sides is compressed and a second of the narrow sides is elongated as the wire harness is bent.

* * * * *